INVENTOR.
JAMES R. TURK
BY
Oberlin, Maky & Donnelly
ATTORNEYS

United States Patent Office 3,188,153
Patented June 8, 1965

3,188,153
SELF-ALIGNING SLEEVE BEARING ASSEMBLY FOR DYNAMOELECTRIC MACHINES AND THE LIKE
James R. Turk, Euclid, Ohio, assignor to Vincent K. Smith, Gates Mills, Ohio
Filed Oct. 17, 1961, Ser. No. 145,652
1 Claim. (Cl. 308—36.4)

This invention relates to a bearing assembly and, more particularly, it relates to a self-aligning sleeve bearing assembly for dynamoelectric machines and the like.

While self-aligning sleeve bearings are known in the art their use on dynamoelectric machines has generally required forming a deep drawn sheet steel end bell and a multiplicity of other parts. Further, such assemblies have required a considerable expenditure for production tooling and assembly labor.

It is, therefore, an object of this invention to provide a bearing assembly of simple construction which permits rapid and easy assembly.

Another object is to provide such a bearing assembly which permits constant lubrication as well as automatic recovery and recirculation of lubricant.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

Figure 1:
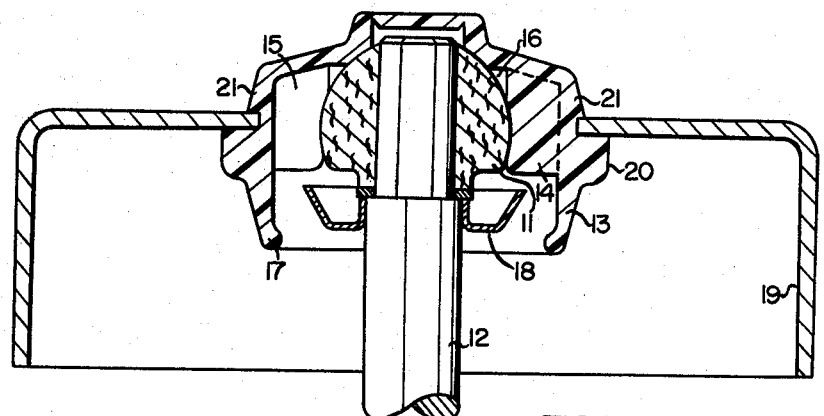
Figure 2:
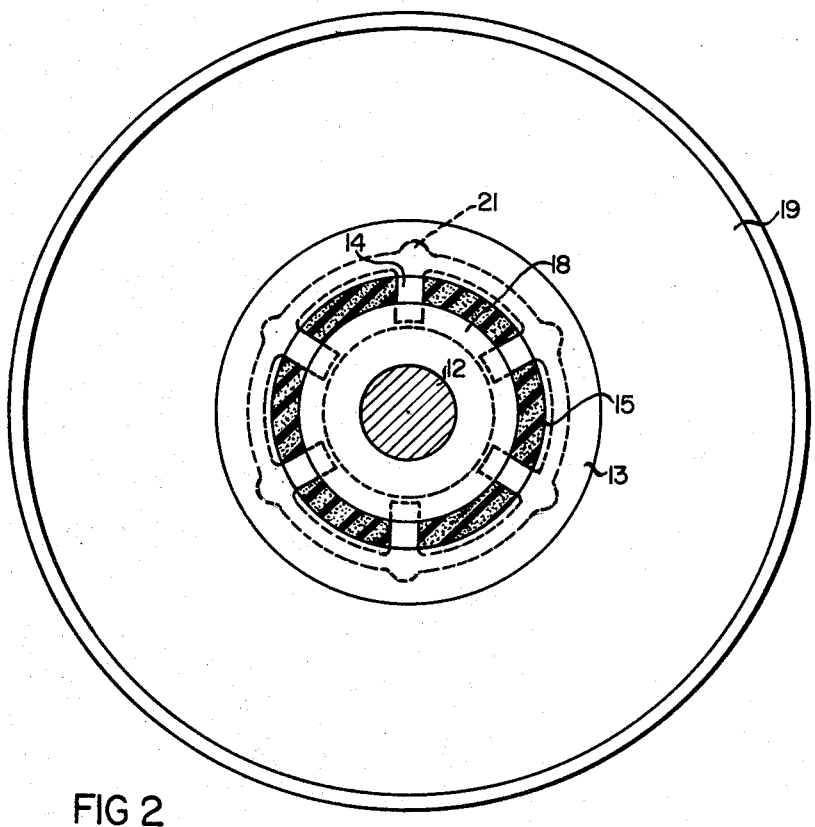

In said annexed drawings:

FIG. 1 is a longitudinal elevation view in section of a bearing assembly according to this invention; and FIG. 2 is an end view of the assembly shown in FIG. 1.

Referring now to the drawings, a spherical surfaced bearing member 11 is a running fit on one end of shaft 12. The bearing member is preferably made of a porous, lubricant saturable material such as sintered bronze. An annular housing 13 is provided having a plurality of radial ribs 14. The internal surfaces of the ribs 14 form a spherical socket adapted to receive the bearing member 11. The housing 13 is preferably integrally injection molded from a thermoplastic material, e.g., from a polyformaldehyde resin such as "Delrin" manufactured by the E. I. du Pont de Nemours & Co. When the housing is constructed from such a material, the bearing member 11 may be mounted therein by merely forcing it into the spherical socket by deforming the ribs 14, and after the bearing member 11 is firmly nested in the spherical socket the ribs 14 regain their original height thereby securing the bearing 11 against axial movement without impairing its ability to move angularly. The spaces 15 between the ribs 14 form reservoir cavities around the bearing surface which are intercommunicated by an annular groove 16 within the socket, i.e., in the interior surface of the ribs 14.

The open end of the housing 13 is formed with a radially inwardly directed peripheral oil retaining lip 17. An annular slinger 18 is mounted on the shaft 12 within the open end of the housing 13; the slinger 18 is concaved in the direction of the reservoir cavities 15.

The reservoir cavities 15 and the annular groove 16 are filled with a porous, lubricant saturable material; an oil saturated, paste-like substance has been found to be quite suitable since it can be injected into the cavities and groove after the assembly is formed.

The entire assembly may be forced into a suitable hole in a sheet steel end bell 19 and held in place therein by peripheral flanged portion 20 on the housing 13 and restrained by a plurality of locking tabs 21 as shown in the drawings.

In operation, the shaft 12 of this assembly is supported by an oil film supplied from the porous bearing 11. Side leakage of the oil at the journal will collect against the oil retaining lip 17 and be reabsorbed by the porous material in the reservoir cavities 15. Any lubricant that leaks around the shaft will collect on the slinger 18 and will be slung back toward the cavities 15. The recirculated oil will maintain equilibrium in each cavity 15 by virtue of the intercommunicating annular groove 16 and will eventually reach the bearing 11 by capillary action.

The ease of assembly of the instant invention is at once obvious; it merely requires the press fitting of the slinger 18 on one end of the shaft 12. The bearing is then forced into the socket formed by the ribs 14 and the entire assembly is then forced into the hole in the end bell 19 whereupon the tabs 21 snap out to lock the plastic housing 13 to the end bell 19.

Other modes of applying the principle of the invention may be employed, change being made as regards the details described, provided the features stated in the following claim or the equivalent of such be employed.

I therefore, particularly point out and distinctly claim as my invention:

A bearing assembly comprising a bearing member of porous, lubricant saturable metal having a spherical surface, a one-piece annular housing of resiliently deformable material having a plurality of radial ribs therein, said ribs forming a spherical socket into which said bearing member is snapped and yieldably retained thereby, the spaces between said ribs forming reservoir cavities for lubricant around said bearing surface, said bearing member and housing defining an annular groove within said socket intercommunicating said reservoir cavities, an annular radial inwardly directed oil retaining lip on said housing, and an annular slinger mounted adjacent to said bearing member within said lip and concaved in the direction of said reservoir cavities, said reservoir cavities being axially open within said lip toward said slinger to receive lubricant upon rotation of said slinger.

References Cited by the Examiner
UNITED STATES PATENTS

| | | | |
|---|---|---|---|
| 558,262 | 4/96 | Darling | 287—88 X |
| 2,149,983 | 3/39 | Smith | 308—72 |
| 2,448,500 | 8/48 | Turner | 308—72 |
| 2,685,658 | 8/54 | Feiertag | 308—132 X |
| 2,704,232 | 3/55 | Johnston et al. | |
| 2,717,792 | 9/55 | Pelley | 287—88 X |

ROBERT C. RIORDON, *Primary Examiner.*
RICHARD A. DOUGLAS, *Examiner.*